(12) United States Patent
Chen et al.

(10) Patent No.: US 10,488,859 B2
(45) Date of Patent: Nov. 26, 2019

(54) SYSTEM AND METHOD FOR GUIDING ROBOT

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chia-Hung Chen, New Taipei (TW); Liang Xie, Shenzhen (CN); Shun-Chuan Yang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 234 days.

(21) Appl. No.: 15/595,964

(22) Filed: May 16, 2017

(65) Prior Publication Data
US 2017/0336786 A1 Nov. 23, 2017

(30) Foreign Application Priority Data
May 20, 2016 (CN) .......................... 2016 1 0341673

(51) Int. Cl.
*G05B 15/00* (2006.01)
*G05D 1/00* (2006.01)
*G05D 1/02* (2006.01)

(52) U.S. Cl.
CPC ........... *G05D 1/0022* (2013.01); *G05D 1/028* (2013.01); *G05D 1/0225* (2013.01); *G05D 1/0242* (2013.01); *Y10S 901/01* (2013.01)

(58) Field of Classification Search
None
See application file for complete search history.

(56) References Cited

U.S. PATENT DOCUMENTS

| | | | | |
|---|---|---|---|---|
| 6,859,010 | B2* | 2/2005 | Jeon | A47L 9/009 320/109 |
| 7,031,805 | B2* | 4/2006 | Lee | B60L 15/2036 700/245 |
| 8,749,196 | B2* | 6/2014 | Cohen | A47L 9/2857 320/109 |
| 2004/0158357 | A1* | 8/2004 | Lee | B60L 15/2036 700/258 |
| 2007/0244610 | A1* | 10/2007 | Ozick | A47L 5/30 701/23 |
| 2007/0250212 | A1* | 10/2007 | Halloran | A47L 5/30 700/245 |
| 2008/0007203 | A1* | 1/2008 | Cohen | A47L 9/2857 320/104 |
| 2008/0039974 | A1* | 2/2008 | Sandin | G05D 1/0225 700/258 |

(Continued)

*Primary Examiner* — Bhavesh V Amin
(74) *Attorney, Agent, or Firm* — ScienBiziP, P.C.

(57) ABSTRACT

A method for guiding a robot includes controlling a wireless signal transmitting device of a charging base to transmit wireless signals, by sending a control signal to the charging base when a battery level of the robot is less than a preset level. Once an orientation of the charging base is determined according to signal strengths of wireless signals detected by at least one signal detecting device of the robot, a moving mechanism of the robot is controlled to drive the robot to move towards the orientation of the charging base.

9 Claims, 3 Drawing Sheets

(56) References Cited

U.S. PATENT DOCUMENTS

| | | | |
|---|---|---|---|
| 2008/0091304 A1* | 4/2008 | Ozick | A47L 5/30 700/258 |
| 2008/0109126 A1* | 5/2008 | Sandin | G05D 1/0225 701/23 |
| 2016/0291595 A1* | 10/2016 | Halloran | A47L 5/30 |
| 2017/0336786 A1* | 11/2017 | Chen | G05D 1/0022 |

* cited by examiner

SYSTEM AND METHOD FOR GUIDING ROBOT

CROSS-REFERENCE TO RELATED APPLICATIONS

This application claims priority to Chinese Patent Application No. 201610341673.2 filed on May 20, 2016, the contents of which are incorporated by reference herein.

FIELD

The subject matter herein generally relates to control technology, and particularly to a robot and a method for guiding the robot.

BACKGROUND

Generally, a robot uses infrared positioning technology to locate its own position. However, because infrared rays have a limited transmitting range and the infrared rays are easily blocked by an object, when the robot is at a position far away from a charging base, the robot may be unable to detect infrared rays transmitted by the charging base. Such that the robot cannot automatically move back to the charging base for recharging because the relative position of the charging base cannot be actually positioned by the robot.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
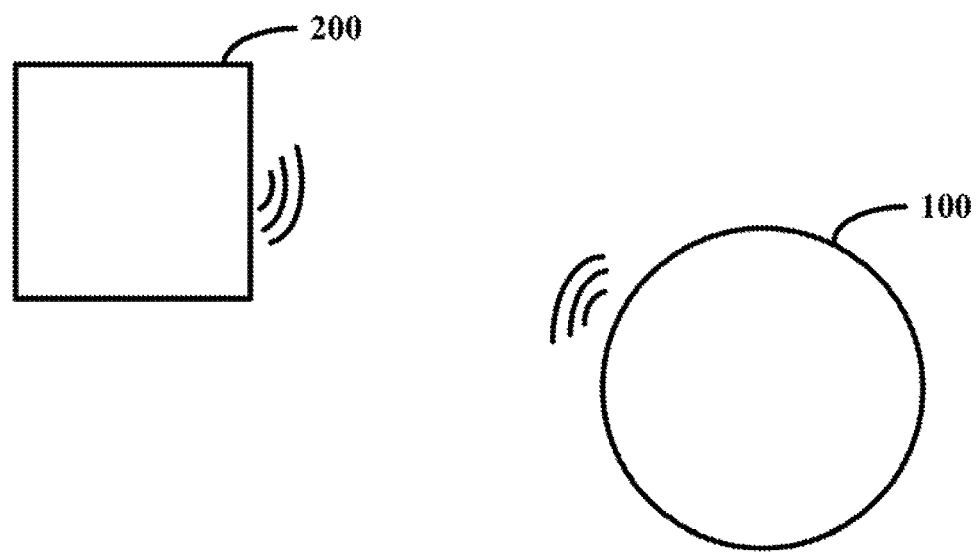
FIG. 1 illustrates an exemplary embodiment of a robot and a charging base.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 2:
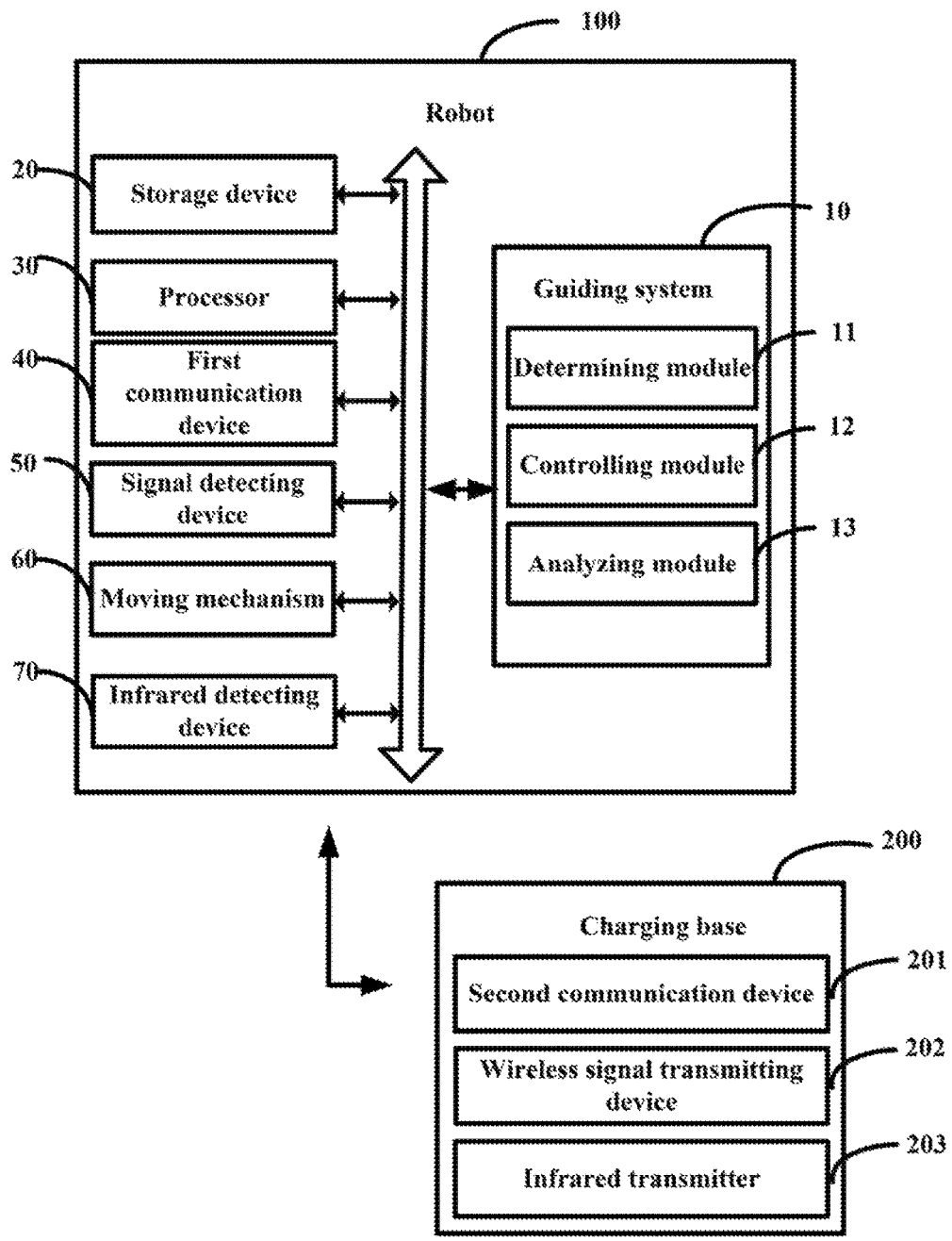
FIG. 2 illustrates a block diagram of an exemplary embodiment of the robot including a guiding system.

FIG. 1 illustrates an exemplary embodiment of a robot 100 and a charging base 200. FIG. 2 illustrates a block diagram of an exemplary embodiment of the robot 100 including a guiding system 10. The charging base 200 can be used to charge the robot 100. The guiding system 10 can control the charging base 200 to transmit wireless signals when a battery level of the robot 100 is less than a preset level. The guiding system 10 can determine an orientation of the charging base 200 in relation to the robot 100 based on signal strengths of wireless signals received by the robot 100 from different orientations. The guiding system 10 can further control the robot 100 to move toward the charging base 200.

In at least one exemplary embodiment, the robot 100 can further include, but is not limited to, a storage device 20, at least one processor 30, a first communication device 40, at least one signal detecting device 50, a moving mechanism 60, and an infrared detecting device 70. The charging base 200 can include, but is not limited to, a second communication device 201, a wireless signal transmitting device 202, and an infrared transmitter 203.

In at least one exemplary embodiment, the storage device 20 can be an internal storage device such as a memory of the robot 100. In other exemplary embodiments, the storage device 20 can be external storage device of the robot 100. For example, the storage device 20 can be a secure digital card, a smart media card, or a flash card. The storage device 20 can be used to store all kinds of data of the robot 100. For example, the storage device 20 can be used to store program codes of the guiding system 10. The at least one processor 30 can be internally configured in the robot 100, or can externally communicate with the robot 100. The at least one processor 30 is in electronic connection with the storage device 20, the first communication device 40, the at least one signal detecting device 50, the moving mechanism 60, and the infrared detecting device 70.

The robot 100 and the charging base 200 can communicate with each other using the first communication device 40 and the second communication device 201. In at least one exemplary embodiment, the first communication device 40 and the second communication device 201 are wireless communication devices such as BLUTOOTH devices, WIFI devices, or ZIGBEE devices. The wireless signal transmitting device 202 can be used to transmit wireless signals. In at least one exemplary embodiment, the wireless signal transmitting device 202 can be BLUTOOTH devices, WIFI devices, or ZIGBEE devices. The at least one signal detecting device 50 can detect wireless signals and detect signal strength of the wireless signals. In at least one exemplary embodiment, when the robot 100 includes more than one signal detecting devices 50, the more than one signal detecting devices 50 can be configured at different orientations on the robot 100. For example, one of the more than one signal detecting devices 50 can be configured on a left side of the robot 100, one of the more than one signal detecting devices 50 can be configured on a right side of the robot 100.

The moving mechanism 60 can drive the robot 100 to move under control of the at least one processor 30. The infrared transmitter 203 can be used to transmit infrared signals. The infrared detecting device 70 can be used to detect infrared signals. In at least one exemplary embodiment, the wireless signal transmitting device 202 and the second communication device 201 can be a same device.

In at least one exemplary embodiment, the guiding system 10 is stored in the storage device 20, and is executed by the at least one processor 30. The at least one processor 30 can execute program codes and all kinds of data stored in the storage device 20 to provide corresponding functions of the robot 100.

In at least one exemplary embodiment, the guiding system 10 can include a determining module 11, a controlling module 12, and an analyzing module 13. The modules 11-13 include computer instructions or codes in form of one or more programs that may be stored in the storage device 20, and are executed by the at least one processor 30.

The determining module 11 can determine whether a battery level of the robot 100 is less than a preset level at predetermined times (e.g., every 1 minute). When the battery level of the robot 100 is less than the preset level, the controlling module 12 can control the infrared transmitter 203 of the charging base 200 to transmit infrared signals by sending a first control signal to the charging base 200. The determining module 11 can determine whether infrared signals are around the robot 100 according to a detecting result of the infrared detecting device 70 of the robot 100. When the infrared signals are detected by the infrared detecting device 70, the controlling module 12 determines that infrared signals are around the robot 100, and can control the moving mechanism 60 to drive the robot 100 to move according to the infrared signals, such that the robot 100 can move to the charging base 200 for recharging. In at least one exemplary embodiment, the infrared detecting device 70 can be a photoelectric detector that can be used to detect infrared rays. In other exemplary embodiments, the infrared detecting device 70 can be a camera device that can be used to capture images. The determining module 11 can determine whether infrared signals exist around the robot 100 by analyzing the images.

If no infrared signals are detected by the infrared detecting device 70, the controlling module 12 can determine that no infrared signals exist around the robot 100, and can determine that the robot 100 is far from the charging base 200. The controlling module 12 can further control the wireless signal transmitting device 202 of the charging base 200 to transmit wireless signals by sending a second control signal to the charging base 200. In other exemplary embodiments, when the battery level of the robot 100 is less than the preset level, the controlling module 12 can directly send the second control signal to the charging base 200 to control the wireless signal transmitting device 202 to transmit wireless signals.

The analyzing module 13 can determine an orientation of the charging base 200 in relation to the robot 100 according to signal strengths of the wireless signals detected by the at least one signal detecting device 50. In at least one exemplary embodiment, the analyzing module 13 can determine that an orientation corresponding to one of the detected wireless signals having the greatest signal strength as the orientation of the charging base 200 in relation to the robot 100.

In at least one exemplary embodiment, when the robot 100 includes only one signal detecting device 50, the signal detecting device 50 can detect the signal strength of the wireless signals received from different orientations as follows: when the signal detecting device 50 detects the signal strength of the wireless signals received from a current orientation (named as "first orientation"), the controlling module 12 can control the signal detecting device 50 to rotate a preset angle towards a predetermined orientation by sending a third control signal to the signal detecting device 50, such that the signal detecting device 50 arrives at a second orientation. The controlling module 12 then controls the signal detecting device 50 to detect the signal strength of the wireless signals received at the second orientation. Similarly, the controlling module 12 can control the signal detecting device 50 to rotate the preset angle to arrive at other orientations, and can control the signal detecting device 50 to detect the signal strength of the wireless signals received at such other orientations. The analyzing module 13 can determine an orientation corresponding to one of the detected wireless signals having the greatest signal strength as the orientation of the charging base 200. In at least one exemplary embodiment, the preset angle can be 15 degrees, 30 degrees, 45 degrees, 60 degrees, or 90 degrees. The predetermined orientation can be a clockwise direction, or a counter-clockwise direction.

In at least one exemplary embodiment, the signal detecting device 50 is configured on a rotating mechanism, the controlling module 12 can control the rotating mechanism to rotate by sending the third control signal to the rotating mechanism such that the signal detecting device 50 is rotated accompanying with the rotate mechanism.

In at least one exemplary embodiment, when the robot 100 includes more than one signal detecting devices 50, the more than one signal detecting devices 50 are configured at different orientations on the robot 100, thus the more than one signal detecting devices 50 can detect signal strengths of wireless signals received from the different orientations. The analyzing module 13 can directly obtain, from the more than one signal detecting devices 50, the signal strengths of wireless signals and orientations of the more than one signal detecting devices 50. The analyzing module 13 can determine an orientation of one of the more than one signal detecting devices 50 that detects the greatest signal strength as the orientation of the charging base 200.

In other exemplary embodiments, when the robot 100 includes more than one signal detecting devices 50, the controlling module 12 also can control the more than one signal detecting devices 50 to rotate, such that the more than one signal detecting devices 50 can detect signal strengths of wireless signals received from different orientations.

The controlling module 12 can control the moving mechanism 60 of the robot 100 to drive the robot 100 to move towards the orientation of the charging base 200.

In at least one exemplary embodiment, during the controlling of the robot 100 according to the orientation of the charging base 200 that is determined according to the signal strength of wireless signals, the analyzing module 13 can determine a new orientation for the charging base 200 each time when the robot 100 moves a preset distance value (e.g., 1 meter). Similarly, the analyzing module 13 can determine the new orientation of the charging base 200 according to current signal strengths of wireless signals detected by the at least one signal detecting device 50. The controlling module 12 can control the moving mechanism 60 of the robot 100 to drive the robot 100 to move towards the new orientation of the charging base 200. Thus the robot 100 can be more accurately controlled by the guiding system 10.

In other exemplary embodiments, the determining module 11 can determine whether infrared signals are around robot 100 at predetermined times (e.g., every 2 minutes). When no infrared signals exist around robot 100, the controlling module 12 continues to control the robot 100 to move according to the signal strength of wireless signals. In other words, when no infrared signals exist around robot 100, the controlling module 12 controls the robot 100 to move towards the orientation of the signal detecting device 50 that detects the greatest signal strength. When infrared signals exist around the robot 100, the controlling module 12 can control the robot 100 to move according to the infrared signals. In other words, when the infrared signals and the wireless signals are both detected, the controlling module 12 controls the robot 100 to move according to the infrared signals. When infrared signals are not detected but wireless signals are detected, the controlling module 12 controls the robot 100 to move towards the orientation of the signal detecting device 50 that detects the greatest signal strength.

Figure 3:
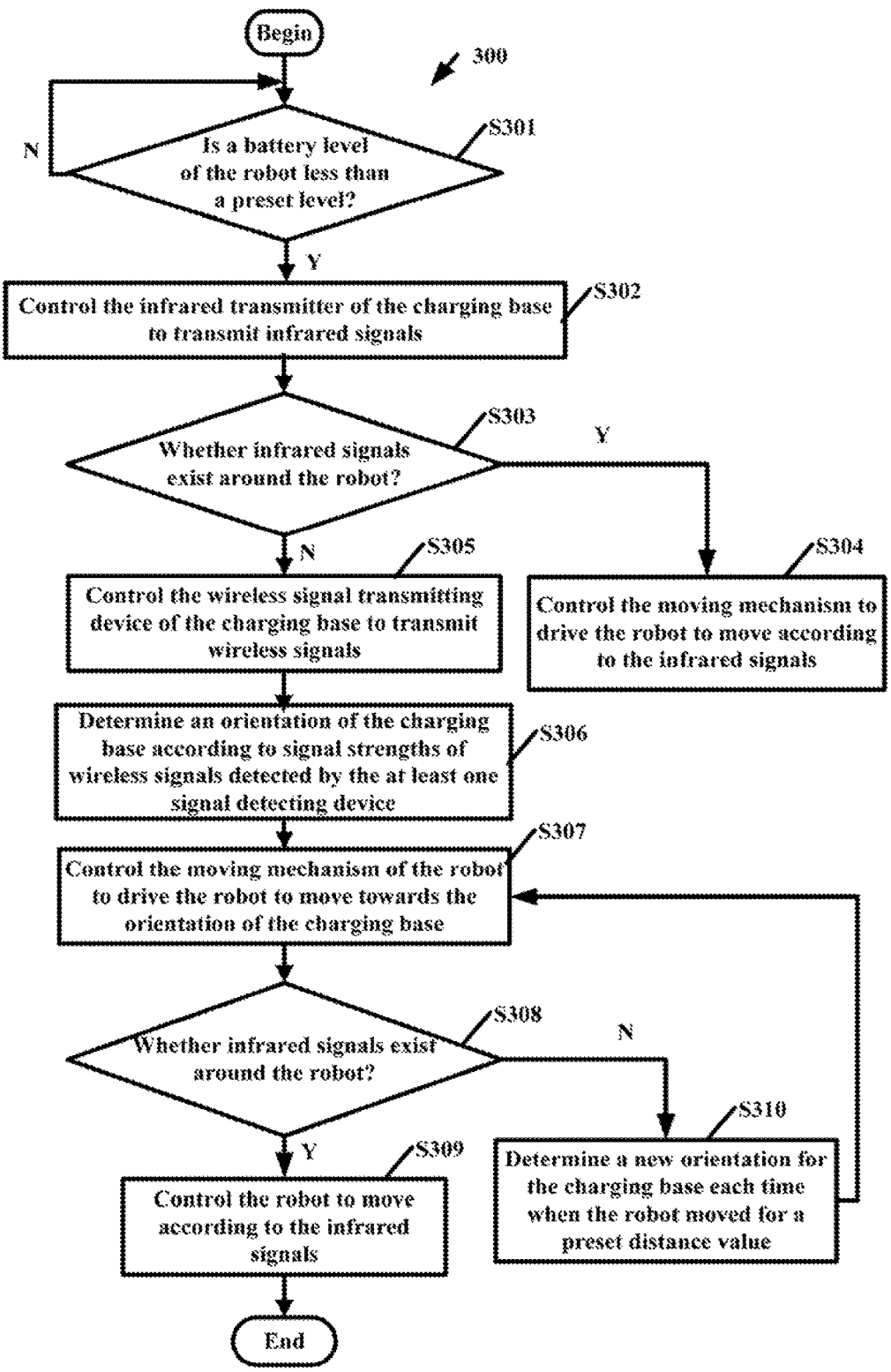
FIG. 3 illustrates an exemplary embodiment of a method for guiding the robot of FIG. 1.

FIG. 3 illustrates an exemplary embodiment of a flowchart of a method. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block S301. Depending on the exemplary embodiment, additional steps can be added, others removed, and the ordering of the steps can be changed.

At block S301, the determining module 11 can determine whether a battery level of the robot 100 is less than a preset level at predetermined times (e.g., every 1 minute). When the battery level of the robot 100 is less than the preset level, the process goes to block S302. In at least one exemplary embodiment, the following blocks S302-S304 can be omitted. In other words, when the battery level of the robot 100 is less than the preset level, the process can directly go to block S305.

At block S302, the controlling module 12 can control the infrared transmitter 203 of the charging base 200 to transmit infrared signals by sending a first control signal to the charging base 200.

At block S303, the determining module 11 can determine whether infrared signals exist around the robot 100 according to a result of detecting by the infrared detecting device 70 of the robot 100. When infrared signals exist around the robot 100, the process goes to block S304. When no infrared signals exist around the robot 100, the process goes to block S305.

In at least one exemplary embodiment, when infrared signals are detected by the infrared detecting device 70, the controlling module 12 can determine that infrared signals exist around the robot 100. When infrared signals are not detected by the infrared detecting device 70, the controlling module 12 can determine that no infrared signals exist around the robot 100.

In at least one exemplary embodiment, the infrared detecting device 70 can be a photoelectric detector that can be used to detect infrared rays. In other exemplary embodiments, the infrared detecting device 70 can be a camera device that can be used to capture images. The determining module 11 can determine whether infrared signals existed around the robot 100 by analyzing the images.

At block S304, the controlling module 12 can control the moving mechanism 60 to drive the robot 100 to move according to the infrared signals such that the robot 100 can move to the charging base 200 for recharging.

At block S305, the controlling module 12 can determine the robot 100 is far from the charging base 200. The controlling module 12 can further control the wireless signal transmitting device 202 of the charging base 200 to transmit wireless signals by sending a second control signal to the charging base 200.

At block S306, the analyzing module 13 can determine an orientation of the charging base 200 in relation to the robot 100 according to signal strengths of wireless signals detected by the at least one signal detecting device 50.

In at least one exemplary embodiment, the analyzing module 13 can determine an orientation corresponding to one of the detected wireless signals having the greatest signal strength as the orientation of the charging base 200.

In at least one exemplary embodiment, when the robot 100 includes only one signal detecting device 50, the signal detecting device 50 can detect signal strengths of wireless signals received from different orientations as follows: when the signal detecting device 50 detects signal strengths of wireless signals received from a current orientation (named as "first orientation"), the controlling module 12 can control the signal detecting device 50 to rotate a preset angle towards a predetermined orientation by sending a third control signal to the signal detecting device 50, such that the signal detecting device 50 arrives at a second orientation. The controlling module 12 then controls the signal detecting device 50 to detect signal strengths of wireless signals received at the second orientation. Similarly, the controlling module 12 can control the signal detecting device 50 to rotate and arrive at other orientations, and can control the signal detecting device 50 to detect signal strengths of wireless signals received from the other orientations. The analyzing module 13 can determine an orientation corresponding to one of detected wireless signals having the greatest signal strength as the orientation of the charging base 200. In at least one exemplary embodiment, the preset angle can be 15 degrees, 30 degrees, 45 degrees, 60 degrees, or 90 degrees. The predetermined orientation can be a clockwise direction, or a counter-clockwise direction.

In at least one exemplary embodiment, the signal detecting device 50 is configured on a rotating mechanism, the controlling module 12 can control the rotating mechanism to rotate by sending the third control signal to the rotating mechanism such that the signal detecting device 50 is rotated accompanying the rotate mechanism.

In at least one exemplary embodiment, when the robot 100 includes more than one signal detecting devices 50, the more than one signal detecting devices 50 are configured at different orientations on the robot 100, thus the more than one signal detecting devices 50 can detect signal strengths of wireless signals received from the different orientations. The analyzing module 13 can directly obtain, from the more than one signal detecting devices 50, the signal strengths of wireless signals and orientations of the more than one signal detecting devices 50. The analyzing module 13 can determine an orientation of one of the more than one signal detecting devices 50 that detects the greatest signal strength as the orientation of the charging base 200.

In other exemplary embodiments, when the robot 100 includes more than one signal detecting devices 50, the controlling module 12 also can control the more than one signal detecting devices 50 to rotate, such that the more than one signal detecting devices 50 can detect signal strengths of wireless signals received from different orientations.

At block S307, the controlling module 12 can control the moving mechanism 60 of the robot 100 to drive the robot 100 to move towards the orientation of the charging base 200. In at least one exemplary embodiment, the following blocks S308-S309 can be omitted. In other words, when the block 307 is executed, the process can directly goes to block S310.

At block S308, the determining module 11 can determine whether infrared signals exist around the robot 100 at predetermined times (e.g., every 2 minutes). When infrared signals exist around the robot 100, the process goes to block S309. When no infrared signals exists around the robot 100, the process goes to block S310.

At block S309, the controlling module 12 can control the robot 100 to move according to the infrared signals.

At block S310, the analyzing module 13 can determine a new orientation for the charging base 200 each time when the robot 100 moved for a preset distance value (e.g., 1 meter).

Similarly, the analyzing module 13 can determine the new orientation of the charging base 200 according to current signal strengths of wireless signals detected by the at least one signal detecting device 50. When the new orientation of the charging base 200 is determined, the process goes to block S307, then the controlling module 12 can control the moving mechanism 60 of the robot 100 to drive the robot 100 to move towards the new orientation of the charging base 200. Blocks S307-S310 can be re-executed until the robot 100 moves to the charging base 200 for recharging.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A robot comprising:
  at least one signal detecting device configured for detecting signal strengths of wireless signals;
  a moving mechanism configured for driving the robot to move;
  a storage device; and
  at least one processor, wherein the storage device stores one or more programs, when executed by the at least one processor, the one or more programs cause the at least one processor to:
  detect signal strengths of wireless signals transmitted by a charging base using the at least one signal detecting device, when a battery level of the robot is less than a preset level;
  determine an orientation of the charging base according to the signal strengths of wireless signals;
  control the moving mechanism to drive the robot to move towards the orientation of the charging base;
  determine at predetermined intervals whether infrared signals exist around the robot;
  control the moving mechanism to drive the robot to move according to the infrared signals when infrared signals exist around the robot;
  when no infrared signals exist around the robot, determine a new orientation for the charging base each time the robot moves for a preset distance value; and
  control the moving mechanism to drive the robot to move towards the new orientation of the charging base.

2. The robot according to claim 1, wherein the at least one processor is further caused to:
  control the at least one signal detecting device to rotate and arrive at different orientations;
  control the at least one signal detecting device to detect signal strengths of wireless signals received from the different orientations; and
  determine an orientation corresponding to one of the detected wireless signals having the greatest signal strength as the orientation of the charging base.

3. The robot according to claim 1, wherein the at least one signal detecting device are more than one signal detecting devices, the more than one signal detecting devices are configured at different orientations, wherein the at least one processor is further caused to:
  obtain, from the more than one signal detecting devices, the signal strengths of wireless signals and orientations of the more than one signal detecting devices; and
  determine an orientation of one of the more than one signal detecting devices that detects the greatest signal strength as the orientation of the charging base.

4. A method for guiding a robot, comprising:
  detecting signal strengths of wireless signals transmitted by a charging base using at least one signal detecting device of the robot, when a battery level of the robot is less than a preset level;
  determining an orientation of the charging base according to the signal strengths of wireless signals;
  controlling a moving mechanism of the robot to drive the robot to move towards the orientation of the charging base;
  determining at predetermined intervals whether infrared signals exist around the robot;
  controlling the moving mechanism to drive the robot to move according to the infrared signals when infrared signals exist around the robot;
  when no infrared signals exist around the robot, determining a new orientation for the charging base each time the robot moves for a preset distance value; and
  controlling the moving mechanism to drive the robot to move towards the new orientation of the charging base.

5. The method according to claim 4, further comprising:
  controlling the at least one signal detecting device to rotate and arrive at different orientations;
  controlling the at least one signal detecting device to detect signal strengths of wireless signals received from the different orientations; and
  determining an orientation corresponding to one of the detected wireless signals having the greatest signal strength as the orientation of the charging base.

6. The method according to claim 4, wherein the at least one signal detecting device comprises more than one signal detecting devices, the more than one signal detecting devices are configured at different orientations, wherein the method further comprises:
  obtaining, from the more than one signal detecting devices, the signal strengths of wireless signals and orientations of the more than one signal detecting devices; and determining an orientation of one of the more than one signal detecting devices that detects the greatest signal strength as the orientation of the charging base.

7. A non-transitory storage medium having stored thereon instructions that, when executed by a processor of a robot, causes the processor to perform a guiding method, wherein the method comprises:
- detecting signal strengths of wireless signals transmitted by a charging base using at least one signal detecting device of the robot, when a battery level of the robot is less than a preset level;
- determining an orientation of the charging base according to the signal strengths of wireless signals;
- controlling a moving mechanism of the robot to drive the robot to move towards the orientation of the charging base;
- determining at predetermined intervals whether infrared signals exist around the robot;
- controlling the moving mechanism to drive the robot to move according to the infrared signals when infrared signals exist around the robot;
- when no infrared signals exist around the robot, determining a new orientation for the charging base each time the robot moves for a preset distance value; and
- controlling the moving mechanism to drive the robot to move towards the new orientation of the charging base.

8. The non-transitory storage medium according to claim 7, wherein the method further comprises:
- controlling the at least one signal detecting device to rotate and arrive at different orientations;
- controlling the at least one signal detecting device to detect signal strengths of wireless signals received from the different orientations; and
- determining an orientation corresponding to one of the detected wireless signals having the greatest signal strength as the orientation of the charging base.

9. The non-transitory storage medium according to claim 7, wherein the at least one signal detecting device comprises more than one signal detecting devices, the more than one signal detecting devices are configured at different orientations, wherein the method further comprises:
- obtaining, from the more than one signal detecting devices, the signal strengths of wireless signals and orientations of the more than one signal detecting devices; and
- determining an orientation of one of the more than one signal detecting devices that detects the greatest signal strength as the orientation of the charging base.

* * * * *